United States Patent
Komatsu

(10) Patent No.: US 9,732,467 B2
(45) Date of Patent: Aug. 15, 2017

(54) INK JET TEXTILE PRINTING METHOD AND INK SET

(71) Applicant: Seiko Epson Corporation, Tokyo (JP)

(72) Inventor: Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/006,534

(22) Filed: Jan. 26, 2016

(65) Prior Publication Data

US 2016/0214401 A1 Jul. 28, 2016

(30) Foreign Application Priority Data

Jan. 27, 2015 (JP) .................. 2015-013016

(51) Int. Cl.
| | |
|---|---|
| D06P 5/30 | (2006.01) |
| C09D 11/00 | (2014.01) |
| B41J 2/21 | (2006.01) |
| B41J 3/407 | (2006.01) |
| D06P 5/04 | (2006.01) |
| D06P 5/06 | (2006.01) |
| D06P 1/642 | (2006.01) |
| D06P 1/651 | (2006.01) |

(52) U.S. Cl.
CPC ............. *D06P 5/30* (2013.01); *B41J 2/2114* (2013.01); *B41J 3/4078* (2013.01); *C09D 11/005* (2013.01); *D06P 1/6426* (2013.01); *D06P 1/65118* (2013.01); *D06P 1/65131* (2013.01); *D06P 5/04* (2013.01); *D06P 5/06* (2013.01)

(58) Field of Classification Search
CPC ...................................... B41J 2/2114
See application file for complete search history.

(56) References Cited

U.S. PATENT DOCUMENTS

| | | | | |
|---|---|---|---|---|
| 2003/0060608 A1* | 3/2003 | Hasemann | .......... | C09B 67/0073 534/618 |
| 2003/0064206 A1* | 4/2003 | Koyano | ................ | C09D 11/54 428/195.1 |
| 2005/0174411 A1* | 8/2005 | Adachi | ................ | B41M 7/0018 347/100 |
| 2006/0057339 A1* | 3/2006 | Adachi | .................. | B41J 2/1752 428/195.1 |
| 2012/0251795 A1* | 10/2012 | Okada | ....................... | D06P 1/44 428/195.1 |
| 2012/0327156 A1* | 12/2012 | Aruga | .................... | B41J 3/4078 347/20 |
| 2013/0027451 A1* | 1/2013 | Li | ........................... | C09D 11/54 347/9 |
| 2015/0239261 A1* | 8/2015 | Sugiyama | .............. | C09D 11/54 347/21 |

FOREIGN PATENT DOCUMENTS

| | | | | |
|---|---|---|---|---|
| JP | EP 0802063 A1 * | 10/1997 | ............ | B41J 2/15 |
| JP | 2004-115974 A | 4/2004 | | |
| JP | 2013-023771 A | 2/2013 | | |
| JP | 2013-060689 A | 4/2013 | | |

* cited by examiner

Primary Examiner — Shelby Fidler
(74) Attorney, Agent, or Firm — Harness, Dickey & Pierce, P.L.C.

(57) ABSTRACT

An ink jet textile printing method includes recording by applying an ink composition containing a dye to a front surface of a fabric by an ink jet method and applying a liquid penetrant to the front surface or a rear surface of the fabric before or after the recording. The liquid penetrant includes a nitrogen compound having a boiling point of 230 to 260° C. and an alkyl polyol having a boiling point of 230 to 260° C. and does not substantially include alkyl polyols having a boiling point higher than 260° C.

5 Claims, No Drawings

INK JET TEXTILE PRINTING METHOD AND INK SET

BACKGROUND

1. Technical Field

The present invention relates to an ink jet textile printing method and an ink set.

2. Related Art

Ink jet recording methods allow high-definition image recording with a relatively simple apparatus and thus have been rapidly developed in various fields. Among them, various studies have been performed on textile printing that uses an ink jet method. For example, JP-A-2013-60689 discloses an ink jet textile printing method for printing fabrics by an ink jet method for the purpose of reducing ink bleeding and providing printed fabrics with small differences in the dye concentration of patterns between front and rear surfaces. The ink jet textile printing method includes an ink jet textile printing process in which an ink composition containing a dye is applied to one surface of a fabric, and following the ink jet textile printing process, at least one of a front side treatment process of applying a first liquid penetrant to the surface on which the ink composition is applied and a rear side treatment process of applying a second liquid penetrant to a surface opposite to the surface of the fabric where the ink composition is applied.

However, the method described in the above-mentioned literature simply uses a penetrant, and therefore differences in color development are caused between the front and rear surfaces of the printed product depending on the composition of the penetrant.

SUMMARY

An advantage of some aspects of the invention is that an ink jet textile printing method which is less likely to cause differences in color development between front and rear surfaces of a printed product is provided.

The inventors have performed intensive research. As a result, it has been found that using a liquid penetrant with a specified composition can achieve the advantage described above.

Thus, the invention is as follows:

[1] An ink jet textile printing method including: recording by applying an ink composition containing a dye to a front surface of a fabric by an ink jet method; and applying a liquid penetrant to the front surface or a rear surface of the fabric before or after the recording, in which the liquid penetrant includes a nitrogen compound having a boiling point of 230 to 260° C. and an alkyl polyol having a boiling point of 230 to 260° C. and does not substantially include alkyl polyols having a boiling point higher than 260° C.

[2] The ink jet textile printing method according to item [1] above, in which the content of the nitrogen compound is 5.0 to 10% by mass relative to 100% by mass of the liquid penetrant.

[3] The ink jet textile printing method according to item [1] or [2] above, in which the content of the alkyl polyol is 20 to 40% by mass relative to 100% by mass of the liquid penetrant.

[4] The ink jet textile printing method according to any one of items [1] to [3] above, in which the liquid penetrant further includes a glycol ether.

[5] The ink jet textile printing method according to any one of items [1] to [4] above, in which the ink composition includes a nitrogen compound having a boiling point of 230 to 260° C. and an alkyl polyol having a boiling point of 230 to 260° C. and does not substantially include alkyl polyols having a boiling point higher than 260° C.

[6] An ink set including: an ink composition containing a dye; and a liquid penetrant, in which the liquid penetrant includes a nitrogen compound having a boiling point of 230 to 260° C. and an alkyl polyol having a boiling point of 230 to 260° C. and does not substantially include alkyl polyols having a boiling point higher than 260° C.

DESCRIPTION OF EXEMPLARY EMBODIMENTS

Embodiments of the invention (hereinafter referred to as "the embodiments") will now be described in the following; however, the invention is not limited thereto. It is to be understood that various modifications can be made without departing from the scope of the invention. As used herein, a "front surface of fabric" refers to a fabric surface on which an ink composition is applied and a "rear surface of fabric" refers to a fabric surface opposite to the surface on which the ink composition is applied.

Ink Jet Textile Printing Method

An ink jet textile printing method according to the embodiment includes: recording by applying an ink composition containing a dye to a front surface of a fabric by an ink jet method; and applying a liquid penetrant to the front surface or a rear surface of the fabric before or after the recording, in which the liquid penetrant includes a nitrogen compound having a boiling point of 230 to 260° C. and an alkyl polyol having a boiling point of 230 to 260° C. and does not substantially include alkyl polyols having a boiling point higher than 260° C.

Fabrics with similar prints on the front and rear surfaces may be desired in some cases. Examples of the methods for providing such fabrics include applying a penetrant which induces penetration of an ink composition into the fabric before or after applying the ink composition to the fabric. However, dyeing inhibition (difficulty of fixing dyes to fabrics) may occur depending on the penetrant composition, or differences in color development may occur between the front and rear surfaces of the printed fabric due to drying of the liquid penetrant before penetration or slow drying of the liquid penetrant.

In the embodiment, a printed fabric which is less likely to undergo dyeing inhibition and has reduced differences in color development between the front and rear surfaces can be provided by using a liquid penetrant with a specified composition. Detailed description will be provided below.

Recording Process

A recording process includes applying an ink composition containing a dye to a front surface of a fabric by an ink jet method. Examples of the ink jet method include, but are not limited to, a charge deflection method, a continuous method, an on-demand method (piezo-type, Bubble Jet® type), and the like.

Ink Composition

An ink composition may include a dye, a solvent, a surfactant, a urea compound, a sugar, a pH adjuster, a chelating agent, an antiseptic, a corrosion inhibitor, and other components.

Dye

A dye may be used as a colorant. Examples of dyes for use herein include, but are not limited to, an acid dye such as C.I. Acid Yellow, C.I. Acid Red, C.I. Acid Blue, C.I. Acid Orange, C.I. Acid Violet, and C.I. Acid Black; a basic dye such as C.I. Basic Yellow, C.I. Basic Red, C.I. Basic Blue, C.I. Basic Orange, C.I. Basic Violet, and C.I. Basic Black; a direct dye such as C.I. Direct Yellow, C.I. Direct Red, C.I. Direct Blue, C.I. Direct Orange, C.I. Direct Violet, and C.I. Direct Black; a reactive dye such as C.I Reactive Yellow, C.I. Reactive Red, C.I. Reactive Blue, C.I. Reactive Orange, C.I. Reactive Violet, and C.I. Reactive Black; and a disperse dye such as C.I. Disperse Yellow, C.I. Disperse Red, C.I. Disperse Blue, C.I. Disperse Orange, C.I. Disperse Violet, and C.I. Disperse Black. One, two, or more dyes described above may be used in the ink composition.

The content of the dye is preferably 1 to 25% by mass, more preferably 4 to 21% by mass, and even more preferably 7 to 17% by mass relative to 100% by mass of the ink composition. When the content of the dye is within such ranges, excellent hiding properties and color reproducibility tend to be obtained.

Solvent

Examples of solvents for use herein include, but are not limited to, water and an organic solvent.

Examples of water include, pure water, such as ion-exchanged water, ultrafiltrated water, reverse osmosis water, and distilled water, and water as free as possible of ionic impurities, such as ultrapure water. Using water sterilized by, for example, irradiation with ultraviolet radiation or the addition of hydrogen peroxide, contamination of ink compositions with fungi or bacteria can be prevented for long-term storage. Therefore, storage stability tends to be improved.

The content of water is preferably 50 to 80% by mass, more preferably 55 to 75% by mass, and even more preferably 60 to 70% by mass relative to 100% by mass of the ink composition.

Examples of organic solvents for use herein include, but are not limited to, a nitrogen compound, an alkyl polyol, and a glycol ether. The ink composition preferably includes among them a nitrogen compound having a boiling point of 230 to 260° C. and an alkyl polyol having a boiling point of 230 to 260° C., contained as in a liquid penetrant described below, and does not substantially include alkyl polyols having a boiling point higher than 260° C. In addition, the ink composition preferably includes a glycol ether which may be contained in the liquid penetrant described below. Differences in color development between the front and rear surfaces of the printed fabric tend to be more reduced as a result of the similarity between the solvent composition of the ink composition and that of the liquid penetrant as above.

The content of the organic solvent is preferably 0.1 to 50% by mass, more preferably 1 to 20% by mass, and even more preferably 12.5 to 17.5% by mass relative to 100% by mass of the ink composition. Differences in color development between the front and rear surfaces of the printed fabric tend to be reduced as a result of the organic solvent levels within such ranges.

Surfactant

Examples of surfactants for use herein include, but are not limited to, an acetylene glycol-based surfactant, a fluoro surfactant, and a silicone-based surfactant. Among them, an acetylene glycol-based surfactant is preferred in terms of fabric penetration properties.

Examples of acetylene glycol-based surfactants include, but are not limited to, preferably at least one selected from 2,4,7,9-tetramethyl-5-decyne-4,7-diol and its alkylene oxide adduct, and 2,4-dimethyl-5-decyn-4-ol and its alkylene oxide adduct. Examples of commercially available acetylene glycol-based surfactants include, but are not limited to, Olfine 104 series and E series such as Olfine E 1010 (trade names, manufactured by Air Products Japan, Inc.), Olfine PD-002W, Surfynol 465, Surfynol 61 (trade names, manufactured by Nissin Chemical Industry Co., Ltd.), and the like. One, two, or more acetylene glycol-based surfactants may be used in the ink composition.

Examples of fluoro surfactants include, but are not limited to, a perfluoroalkylsulfonic acid salt, a perfluoroalkylcarboxylic acid salt, a perfluoroalkyl phosphate, a perfluoroalkyl-ethylene oxide adduct, a perfluoroalkyl betaine, and a perfluoroalkylamine oxide compound. Examples of commercially available fluoro surfactants include, but are not limited to, S-144, S-145 (manufactured by Asahi Glass Co., Ltd.); FC-170C, FC-430, Fluorad FC 4430 (manufactured by Sumitomo 3M Ltd.); FSO, FSO-100, FSN, FSN-100, FS-300 (manufactured by DuPont); FT-250, 251 (manufactured by Neos Co., Ltd.), and the like. One, two, or more fluoro surfactants may be used in the ink composition.

Silicone-based surfactants include, for example, a polysiloxane compound and a polyether-modified organosiloxane. Commercially available silicone-based surfactants include, but are not limited to, particularly for example BYK-306, BYK-307, BYK-333, BYK-341, BYK-345, BYK-346, BYK-347, BYK-348, BYK-349 (trade names, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

The content of the surfactant is preferably 0.1 to 5% by mass and more preferably 0.5 to 2% by mass relative to 100% by mass of the ink composition.

Urea Compound

A urea compound serves as a moisturizer of the ink composition or as a dyeing auxiliary for improving dye fixation. Examples of urea compounds for use herein include, but are not limited to, urea, ethyleneurea, tetramethylurea, thiourea, 1,3-dimethyl-2-imidazolidinone, and the like. When a urea compound is contained, the content of the urea compound is preferably 1 to 10% by mass relative to the total mass of the ink composition.

Sugar

A sugar serves as a moisturizer for suppressing solidification and drying out of the ink composition. Examples of sugars include, but are not limited to, glucose, mannose, fructose, ribose, xylose, arabinose, galactose, aldonic acid, glucitol (sorbit), maltose, cellobiose, lactose, sucrose, trehalose, maltotriose, and the like.

pH Adjuster

Examples of pH adjusters for use herein include, but are not limited to, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, tris(hydroxymethyl)aminomethane (THAM), Good's buffers such as 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), cholamine chloride, N,N-bis(2-hydroxyethyl)-2-aminoethanesulfonic acid (BES), N-tris(hydroxymethyl)methyl-2-aminoethanesulfonic acid (TES), acetamidoglycine, tricine, glycinamide, and bicine, a phosphate buffer, and a tris buffer. One, two, or more pH adjusters may be used in the ink composition.

Chelating Agent

Examples of chelating agents for use herein include, but are not limited to, ethylenediaminetetraacetic acid, its salts (such as ethylenediaminetetraacetic acid dihydrogen disodium salt), and the like.

Antiseptic

Examples of antiseptics for use herein include, but are not limited to, sodium benzoate, sodium pentachlorophenolate, 2-pyridinethiol-1-oxide sodium salt, sodium sorbate, sodium dehydroacetate, 1,2-dibenzoisothiazolin-3-one (Proxel CRL, Proxel BDN, Proxel GXL, Proxel XL 2, Proxel TN, and Proxel LV by Zeneca), 4-chloro-3-methylphenol (such as Preventol CMK by Bayer), and the like. One, two, or more antiseptics may be used in the ink composition.

Corrosion Inhibitor

Examples of corrosion inhibitors for use herein include, but are not limited to, benzotriazole and the like.

Other Components

Various additives such as an antioxidant, a UV absorber, an oxygen absorber, and an auxiliary solubilizer may also be added to the ink composition used in the embodiment so as to maintain good storage stability and discharge stability from a print head, improve anticlogging properties, or prevent deterioration of the ink composition.

Fabric

Examples of fibers constituting fabrics include, but are not limited to, natural fibers such as silk, cotton, hemp, and wool; synthetic fibers such as polyester fibers, nylon fibers, triacetate fibers, diacetate fibers, and polyamide fibers; and regenerated fibers such as rayon. The fabric may be composed of a single fiber or a blend of two or more fibers. Among them, with a fabric especially composed of a blend of fibers with different penetration properties, it is easy for the liquid penetrant to achieve its effect. The fabric may be in any form of the fibers described above such as a woven fabric, a knitted fabric, or a nonwoven fabric.

Examples of combinations of the fabric and dye include, but are not limited to, a reactive dye and a cellulose-based fiber (such as cotton, hemp, and rayon), an acid dye and silk, wool, or a nylon fiber, a basic dye and an acrylic fiber, a direct dye and cotton, hemp, or rayon, and a disperse dye and a polyester fiber. Among them, a reactive dye with a cellulose-based fiber, and an acid dye with silk, wool, or a nylon fiber are preferred. Differences in color development between the front and rear surfaces of the printed fabric tend to be further reduced by such combinations. However, combinations of the fabric and dye are not limited to such combinations.

According to the ink jet textile printing method of the embodiment, using a liquid penetrant described below can reduce differences in color development between the front and rear surfaces of the printed fabric without having to adjust compositions of the liquid penetrant in accordance with the fabrics.

Liquid Penetrant Application Process

A liquid penetrant application process refers to applying a liquid penetrant to the front surface or the rear surface of the fabric before or after the recording process. Examples of methods for applying a liquid penetrant include, but are not limited to, a roller method, a spray method, and an ink jet method. Among them, an ink jet method is preferred in terms of being able to selectively apply the liquid penetrant.

The liquid penetrant application process may be conducted before the recording process, after the recording process, or both before and after the recording process. When the application is conducted before the recording process, the recording process is preferably conducted before the liquid penetrant applied to a fabric dries. When the application is conducted after the recording process, the liquid penetrant application may be conducted before or after an ink composition applied to a fabric dries, although the application before the ink composition dries is preferred. The liquid penetrant may be applied to the front surface, applied to the rear surface, or applied to both the front surface and rear surface of a fabric.

Liquid Penetrant

The liquid penetrant includes a nitrogen compound having a boiling point of 230 to 260° C. and an alkyl polyol having a boiling point of 230 to 260° C. and does not substantially include alkyl polyols having a boiling point higher than 260° C.

Nitrogen Compound Having a Boiling Point of 230 to 260° C.

Examples of a nitrogen compound having a boiling point of 230 to 260° C. for use herein include, but are not limited to, 2-pyrrolidone (245° C.) and 5-methyl-2-pyrrolidone (248° C.). Of them, 2-pyrrolidone is preferred. When such nitrogen compound is contained, penetration properties are further improved, thus differences in color development between the front and rear surfaces of the printed fabric are reduced. The values in parentheses represent standard boiling points. One, two, or more of the nitrogen compounds may be used.

The boiling point of the nitrogen compound is 230 to 260° C., preferably 235 to 255° C., and more preferably 240 to 250° C. Differences in color development between the front and rear surfaces of the printed fabric are reduced as a result of the nitrogen compound having a boiling point within such ranges.

The content of a nitrogen compound having a boiling point of 230 to 260° C. is preferably 1.0 to 15% by mass, more preferably 2.5 to 12.5% by mass, and even more preferably 5.0 to 10% by mass relative to 100% by mass of the liquid penetrant. When the content of the nitrogen compound having a boiling point of 230 to 260° C. is at least 1.0% by mass, the penetration properties tend to be improved and thus differences in color development between the front and rear surfaces of the printed fabric tend to be reduced. In addition, dryability tends to be improved with the content of the nitrogen compound having a boiling point of 230 to 260° C. being 15% or less by mass.

Alkyl Polyol Having a Boiling Point of 230 to 260° C.

Examples of an alkyl polyol having a boiling point of 230 to 260° C. for use herein include, but are not limited to, 1,4-butanediol (230° C.), 2-methyl-2-propyl-1,3-propanediol (230° C.), dipropylene glycol (230° C.), 1,5-pentanediol (242° C.), 2-ethyl-1,3-hexanediol (244° C.), diethylene glycol (245° C.), 3-methyl-1,5-pentanediol (249° C.), and 1,6-hexanediol (250° C.). Among them, diethylene glycol (245° C.) is preferred. With such alkyl polyols being contained, anticlogging reliability is further improved when applying the liquid penetrant by an ink jet method. The values in parentheses represent standard boiling points. One, two, or more of the alkyl polyols may be used.

The boiling point of the alkyl polyol is 230 to 260° C., preferably 235 to 255° C., and more preferably 240 to 250° C. Differences in color development between the front and rear surfaces of the printed fabric are further reduced by the alkyl polyol having a boiling point within such ranges.

The content of an alkyl polyol having a boiling point of 230 to 260° C. is preferably 10 to 50% by mass, more preferably 15 to 45% by mass, and even more preferably 20 to 40% by mass relative to 100% by mass of the liquid penetrant. With the content of the alkyl polyol being at least 10% by mass, clogging tends to be reduced when the liquid penetrant is discharged from an ink jet nozzle.

Alkyl Polyol Having a Boiling Point Higher than 260° C.

The liquid penetrant does not substantially include alkyl polyols having a boiling point higher than 260° C. The term "not substantially include" means that the content of an alkyl polyol having a boiling point higher than 260° C. is preferably 0 to 1.0% by mass, more preferably 0 to 0.050% by mass, and even more preferably 0 to 0.10% by mass relative to 100% by mass of the liquid penetrant. Differences in color development between the front and rear surfaces of the printed fabric are especially reduced by substantially no alkyl polyols having a boiling point higher than 260° C. being included.

Examples of the alkyl polyols having a boiling point higher than 260° C. include, but are not limited to, triethylene glycol (287° C.) and glycerin (290° C.)

Glycol Ether

The liquid penetrant may further contain a glycol ether. When glycol ethers are contained, penetration properties and continuous discharge stability tend to be improved. Examples of the glycol ethers for use herein include, but are not limited to, dipropylene glycol dimethyl ether (171° C.), diethylene glycol ethyl methyl ether (176° C.), diethylene glycol isopropyl methyl ether (179° C.), dipropylene glycol monomethyl ether (188° C.), diethylene glycol diethyl ether (189° C.), diethylene glycol monomethyl ether (194° C.), diethylene glycol butyl methyl ether (212° C.), tripropylene glycol dimethyl ether (215° C.), triethylene glycol dimethyl ether (216° C.), diethylene glycol monobutyl ether (230° C.), ethylene glycol monophenyl ether (245° C.), triethylene glycol monomethyl ether (249° C.), diethylene glycol dibutyl ether (256° C.), and triethylene glycol monobutyl ether (272° C.). Among them, glycol ethers having a boiling point of 230 to 260° C. are preferred, and diethylene glycol monobutyl ether (230° C.), ethylene glycol monophenyl ether (245° C.), triethylene glycol monomethyl ether (249° C.), and diethylene glycol dibutyl ether (256° C.) are more preferred. Using such glycol ethers tends to improve color development on the rear surface of the printed fabric. The values in parentheses represent standard boiling points. One, two, or more of the glycol ethers may be used in the liquid penetrant.

The boiling point of the glycol ether is preferably 175 to 300° C., more preferably 200 to 285° C., and even more preferably 225 to 275° C. Differences in color development between the front and rear surfaces of the printed fabric tend to be reduced by the glycol ether having a boiling point within such ranges.

The content of the glycol ether is preferably 1.0 to 15% by mass, more preferably 1.5 to 10% by mass, and even more preferably 2.5 to 5.0% by mass relative to 100% by mass of the liquid penetrant. With the content of the glycol ether being at least 1.0% by mass, continuous discharge stability tends to be improved when the liquid penetrant is discharged from an ink jet nozzle.

Other Components

The liquid penetrant may further contain a surfactant, a urea compound, a sugar, a pH adjuster, a chelating agent, an antiseptic, a corrosion inhibitor, and other components. Examples of the other components include, but are not limited to, those described in examples of the ink composition.

Viscosity

Viscosity of the liquid penetrant is preferably 2 to 10 mPa·s, more preferably 3 to 5 mPa·s, and even more preferably 3.5 to 4.5 mPa·s at 25° C. Viscosity of the ink composition can be obtained by performing the measurement according to JIS 28809 with a vibration-type viscometer.

Heating Process

An ink jet textile printing method according to the embodiment may further include a heating process for heating the fabric after the recording and liquid penetrant application processes. The heating process allows fibers constituting the fabric to be dyed more suitably with a dye. Examples of the heating methods include, but are not limited to, HT process (high-temperature steaming), HP process (high-pressure steaming), and a thermosol process.

In addition, the fabric surface having the ink composition may be or may not be pressed in the heating process. The heating process without pressing the fabric surface having the ink composition includes oven drying (using, for example, a conveyor oven or a batch oven without pressing). Productivity of recorded matter is further increased by employing such heating processes. Examples of the heating process with pressing the fabric surface having the ink composition include, but are not limited to, a heat press process and a wet-on-dry process. As used herein, "pressing" refers to applying pressure to a recording substrate through contact with a solid.

The heating temperature is preferably 80 to 150° C. and more preferably 90 to 110° C. The heating temperature within such ranges tends to allow fibers constituting the fabric to be further desirably dyed with a dye.

Washing Process

An ink jet textile printing method according to the embodiment may further include a washing process for washing the fabric after the heating process. The washing process allows unused dyes to be removed effectively. The washing process may be conducted by using, for example, water, with an optional soaping process. The soaping process includes, but is not limited to, for example, a method for washing off unfixed dyes with, for example, a heated soap solution.

Ink Set

An ink set according to the embodiment includes an ink composition containing a dye, and a liquid penetrant, the liquid penetrant including a nitrogen compound having a boiling point of 230 to 260° C. and an alkyl polyol having a boiling point of 230 to 260° C. and does not substantially include alkyl polyols having a boiling point higher than 260° C.

The ink composition and liquid penetrant for use in the ink set include those described above.

EXAMPLES

The invention is now described by the examples and comparative examples below. The invention is not in any way limited to the examples.

Ink Composition Materials

Materials used in the following examples and comparative examples are as follows:

Dye
  C.I. Reactive Black 39
Glycol Ethers
  Diethylene glycol monobutyl ether (standard boiling point 230° C.)
  Triethylene glycol monobutyl ether (standard boiling point 272° C.)
Alkyl Polyols
  1,2-propanediol (standard boiling point 188° C.)
  Diethylene glycol (standard boiling point 245° C.)
  Triethylene glycol (standard boiling point 287° C.)
  Glycerin (standard boiling point 290° C.)
Nitrogen Compounds
  N-ethyl-2-pyrrolidone (standard boiling point 212° C.)
  2-pyrrolidone (standard boiling point 245° C.)
Surfactant
  Olfine PD-002W (acetylene-based surfactant, manufactured by Nissin Chemical Industry Co., Ltd.)

Moisturizer
  Urea
pH Adjuster
  Tris(hydroxymethyl)aminomethane
Antiseptic
  Proxel XL2 (trade name, manufactured by Lonza Japan)

Preparation of Ink Compositions 1 and 2

Materials were mixed according to the composition in Table 1 below and well stirred to give ink compositions I-1 and I-2. In particular, each of the materials was uniformly mixed and filtered through a membrane filter (pore size 1 μm) to give ink compositions I-1 and I-2. The values in Table 1 below are given as % by mass and total 100.0% by mass.

TABLE 1

| | Ink composition | I-1 | I-2 |
|---|---|---|---|
| Dye | C.I. Reactive Black 39 | 15 | 15 |
| Glycol ether | Diethylene glycol monobutyl ether (b.p. 230° C.) | 2.5 | 2.5 |
| Alkyl polyol | Diethylene glycol (b.p. 245° C.) | 5 | 5 |
| Nitrogen compound | 2-Pyrrolidone (b.p. 245° C.) | 8 | 3 |
| Surfactant | Olfine PD-002W | 0.1 | 0.1 |
| Other components | Urea | 3.5 | 3.5 |
| | Glycerin | — | 8.0 |
| | Tris(hydroxymethyl)aminomethane | 0.5 | 0.5 |
| | Proxel XL2 | 0.3 | 0.3 |
| | Ion-exchanged water | balance | balance |
| Total (% by mass) | | 100 | 100 |

Liquid Penetrant Preparation

Materials were mixed according to the composition in Table 2 below and well stirred to give each liquid penetrant. In particular, each of the materials was uniformly mixed and filtered through a membrane filter (pore size 1 μm) to give each liquid penetrant. The values in Table 2 below are given as % by mass and total 100.0% by mass.

Evaluation of Front Surface Color Development and Differences in Color Development Between Front and Rear Surfaces A yellow cartridge of an ink jet printer PX-G930 (manufactured by Seiko Epson Corporation) was filled with the resulting ink composition I-1, while a cyan cartridge was filled with the liquid penetrant. Fabric 1 (100% cotton; basis weight 130 g/m$^2$) was set in the printer, and a solid pattern with green 200% duty (yellow data 100% duty+cyan data 100% duty) was formed to allow ink composition I-1 and the liquid penetrant to adhere to the front surface of fabric 1. The image resolution was 1440×720 dpi.

Fabric 1 coated with ink composition I-1 and the liquid penetrant on the front surface was subjected to steaming at 102° C. for 10 minutes, washed with an aqueous solution containing 0.2% by mass of Laccol STA (surfactant manufactured by Meisei Chemical Works, Ltd.) at 90° C. for 10 minutes, and dried to give sample 1.

A yellow cartridge was filled with ink composition I-2 instead of ink composition I-1, and fabric 2 (100% silk; basis weight 60 g/m$^2$) was set in the printer and printed with a solid pattern with green 200% duty (yellow data 100% duty+cyan data 100% duty) to allow ink composition I-2 and the liquid penetrant to adhere to the front surface of fabric 2. The image resolution was 1440×720 dpi.

Fabric 2 coated with ink composition I-2 and the liquid penetrant on the front surface was subjected to steaming at 100° C. for 30 minutes, washed with an aqueous solution containing 0.2% by mass of Laccol STA (surfactant manufactured by Meisei Chemical Works, Ltd.) at 55° C. for 10 minutes, and dried to give sample 2.

OD (color optical density) values of the resulting samples were measured by using a colorimeter (trade name "Gretag Macbeth Spectrolino" manufactured by X-Rite) to evaluate the front surface color development and differences in color development between the front and rear surfaces of the fabrics by the measured OD values according to the following criteria.

TABLE 2

| | | Examples | | | | | Comparative examples | | |
|---|---|---|---|---|---|---|---|---|---|
| Liquid penetrant composition | | 1 | 2 | 3 | 4 | 5 | 1 | 2 | 3 |
| Glycol ether | Diethylene glycol monobutyl ether (b.p. 230° C.) | 2.5 | 5 | 2.5 | | | 2.5 | 2.5 | Without penetrant |
| | Triethylene glycol monobutyl ether (b.p. 272° C.) | | | | | 2.5 | | | |
| Alkyl polyol | 1,2-Propanediol (b.p. 188° C.) | | | | | | 35 | | |
| | Diethylene glycol (b.p. 245° C.) | 35 | 40 | 15 | 40 | 35 | | | |
| | Triethylene glycol (b.p. 287° C.) | | | | | | | 35 | |
| Nitrogen compound | N-ethyl-2-pyrrolidone (b.p. 212° C.) | | | | | | 10 | | |
| | 2-pyrrolidone (b.p. 245° C.) | 10 | 3 | 10 | 10 | 10 | | 10 | |
| Surfactant | Olfine PD-002W | 0.5 | 0.5 | 0.5 | 0.5 | 0.5 | 0.5 | 0.5 | |
| Other components | Urea | 3.5 | 3.5 | 3.5 | 3.5 | 3.5 | 3.5 | 3.5 | |
| | Tris(hydroxymethyl)aminomethane | 0.5 | 0.5 | 0.5 | 0.5 | 0.5 | 0.5 | 0.5 | |
| | Proxel XL2 | 0.3 | 0.3 | 0.3 | 0.3 | 0.3 | 0.3 | 0.3 | |
| | Ion-exchanged water | Bal. | Bal. | Bal. | Bal. | Bal. | Bal. | Bal. | |
| | Total (% by mass) | 100 | 100 | 100 | 100 | 100 | 100 | 100 | |
| Ink composition I-1 penetration evaluation | Front surface color development | A | A | A | A | B | A | D | A |
| | Differences in color development between front and rear surfaces | A | B | A | A | A | D | A | D |
| Ink composition I-2 penetration evaluation | Front surface color development | A | A | A | A | A | A | B | A |
| | Differences in color development between front and rear surfaces | A | C | A | B | B | C | A | D |

Front Surface Color Development
  Criteria are:
A: front surface OD value 1.4 or more;
B: front surface OD value 1.3 or more and less than 1.4;
C: front surface OD value 1.2 or more and less than 1.3; and
D: front surface OD value less than 1.2.
OD value difference between front and rear surfaces
  Criteria are:
A: OD value difference between front and rear surfaces less than 0.1;
B: OD value difference between front and rear surfaces 0.1 or more and less than 0.2;
C: OD value difference between front and rear surfaces 0.2 or more and less than 0.3; and
D: OD value difference between front and rear surfaces 0.3 or more.

The entire disclosure of Japanese Patent Application No. 2015-013016, filed Jan. 27, 2015 is expressly incorporated by reference herein.

What is claimed is:

1. An ink jet textile printing method comprising:
    recording by applying an ink composition containing a dye to a front surface of a fabric by an ink jet method and
    applying a liquid penetrant to the front surface or a rear surface of the fabric before or after the recording,
    wherein the ink composition and the liquid penetrant each include a nitrogen compound having a boiling point of 230 to 260° C., an alkyl polyol having a boiling point of 230 to 260° C., and does not substantially contain alkyl polyols having a boiling point higher than 260° C. and
    wherein the alkyl polyol having the boiling point of 230 to 260° C. is at least one of 1,4-butanediol, 2-methyl-2-propyl-1,3-propanediol, dipropylene glycol, 1,5-pentanediol, 2-ethyl-1,3-hexanediol, 3-methyl-1,5-pentanediol, and 1,6-hexanediol.

2. The ink jet textile printing method according to claim 1, wherein the content of the nitrogen compound is 5.0 to 10% by mass relative to 100% by mass of the liquid penetrant.

3. The ink jet textile printing method according to claim 1, wherein the content of the alkyl polyol having a boiling point of 230 to 260° C. is 20 to 40% by mass relative to 100% by mass of the liquid penetrant.

4. The ink jet textile printing method according to claim 1, wherein the liquid penetrant further includes a glycol ether.

5. An ink set comprising:
    an ink composition containing a dye; and
    a liquid penetrant,
    wherein the ink composition and the liquid penetrant each include a nitrogen compound having a boiling point of 230 to 260° C., an alkyl polyol having a boiling point of 230 to 260° C., and does not substantially contain alkyl polyols having a boiling point higher than 260° C., and
    wherein the alkyl polyol having the boiling point of 230 to 260° C. is at least one of 1,4-butanediol, 2-methyl-2-propyl-1,3-propanediol, dipropylene glycol, 1,5-pentanediol, 2-ethyl-1,3-hexanediol, 3-methyl-1,5-pentanediol, and 1,6-hexanediol.

* * * * *